United States Patent
Russell et al.

[11] 3,861,137
[45] Jan. 21, 1975

[54] MONOPROPELLANT ELECTROLYTIC IGNITER

[75] Inventors: Sid Russell, Suffield; Terry L. Fondrk, Manchester, both of Conn.

[73] Assignee: The United States of America as represented by the Secretary of the Air Force, Washington, D.C.

[22] Filed: June 19, 1973

[21] Appl. No.: 371,443

[52] U.S. Cl. ...... 60/39.82 P, 60/39.82 C, 60/39.46, 60/203, 250/531
[51] Int. Cl. ............................................. F02k 9/02
[58] Field of Search ........ 60/39.46, 200 R, 39.82 P, 60/39.82 R, 39.82 C, 203, 257; 219/293; 250/531; 204/164

[56] References Cited
UNITED STATES PATENTS

| | | | |
|---|---|---|---|
| 2,849,357 | 8/1958 | Devins et al. | 250/531 |
| 2,975,588 | 3/1961 | Smith | 60/203 |
| 3,196,614 | 7/1965 | Toone et al. | 60/39.82 C |
| 3,210,927 | 10/1965 | Brinich et al. | 60/203 |
| 3,533,233 | 10/1970 | Fiedler et al. | 60/39.46 |
| 3,651,644 | 3/1972 | Breen et al. | 60/203 |
| 3,674,666 | 7/1972 | Foster et al. | 204/164 |
| 3,740,198 | 6/1973 | Sandlin et al. | 60/39.46 |

*Primary Examiner*—Carlton R. Croyle
*Assistant Examiner*—Warren Olsen
*Attorney, Agent, or Firm*—Harry A. Herbert, Jr.; Arsen Tashjian

[57] ABSTRACT

An electrolytic igniter adapted for use in a rocket engine in which an electrolytically dissociatable fluid monopropellant is useable. The basic structure of the igniter includes: a first electrode preferably in the form of a porous metal film, or of a screen, of electrically conductive material, with an attachment for an electrical lead; a second electrode preferably also in the form of a thin porous metal film, or of a screen, of electrically conductive material, with an attachment for another electrical lead; and a thin porous electrical insulator disposed between, and separating, the first electrode and the second electrode. When a low voltage, such as from 2 to 30 volts, is applied across the electrodes, and when thereafter an electrolytically dissociatable fluid monopropellant is fed into, and through, the first electrode, the porous electrical insulator, and the second electrode, an initial surge of current is produced, heat is generated, and the monopropellant ignites, burns, and forms very hot propellant gases. The monopropellant continues to burn even after the electrical power is turned off. The "burn" is ended simply by stopping the in-flow of the monopropellant. The use of this igniter permits the use of a stable monopropellant, thereby eliminating the exacting requirement for precise dual metering and simultaneous flow activation of the two separate fluids, which is inherent with the use of bipropellant. Additionally, the igniter requires only a very low voltage source.

10 Claims, 7 Drawing Figures

PATENTED JAN 21 1975　　　　　　3,861,137

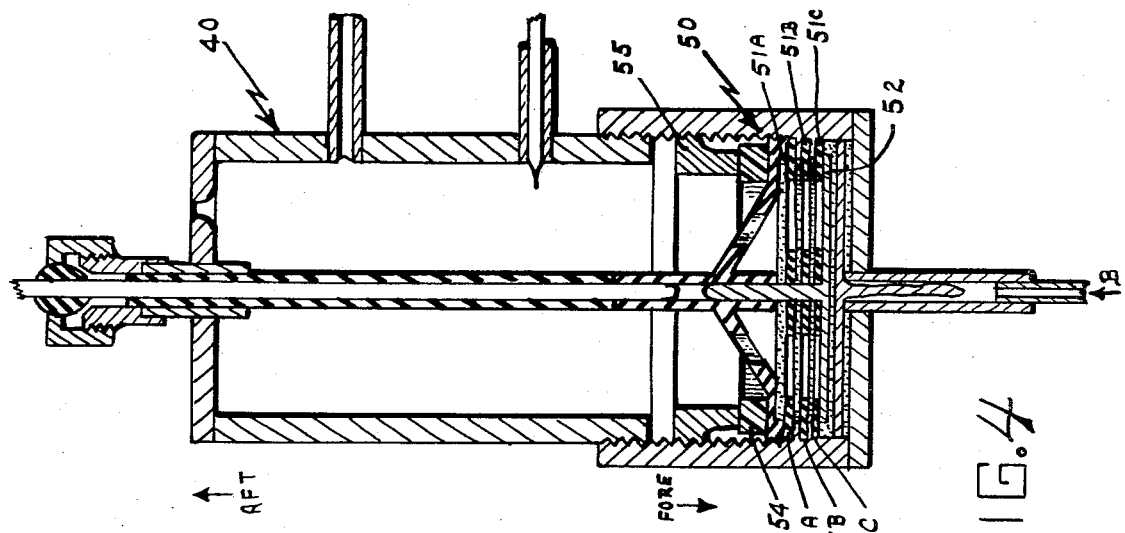
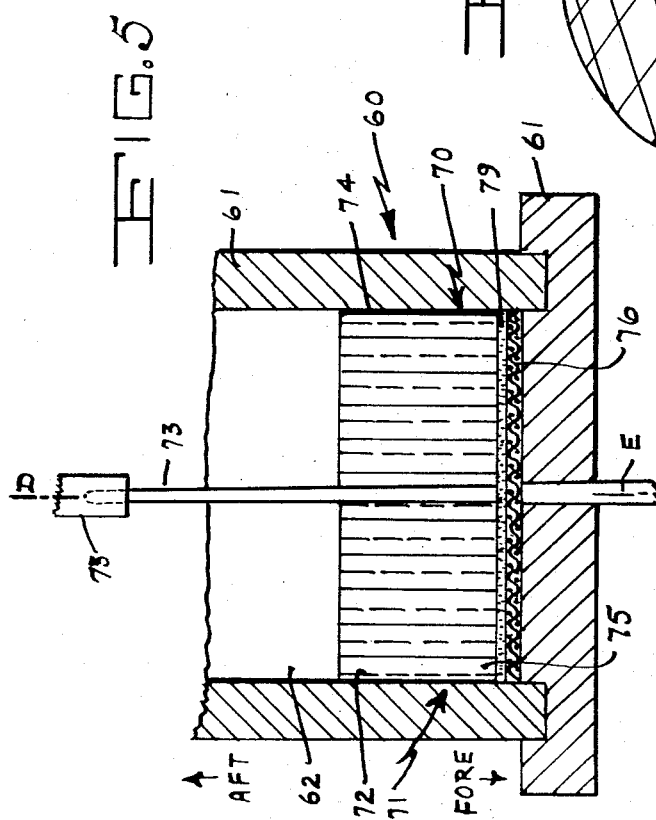
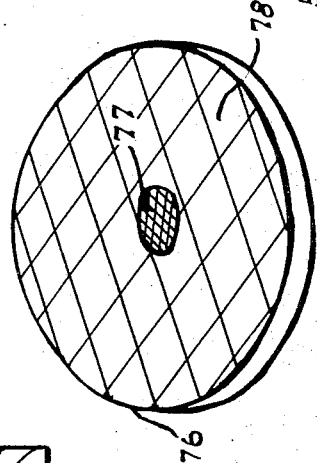
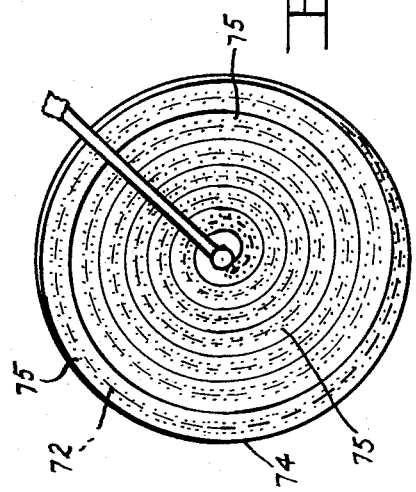

MONOPROPELLANT ELECTROLYTIC IGNITER

BACKGROUND OF THE INVENTION

This invention relates to an electrolytic device and, more particularly, to embodiments thereof which are adapted for use, individually, as electrolytic igniters for rocket engines in which an electrolytically dissociatable, i.e., an ionically conductive, fluid monopropellant is useable.

The use of such a fluid monopropellant as fuel for a "liquid," i.e., a fluid rocket engine, as distinguished from a "solid" rocket engine, affords many advantages over the use of a bipropellant in such a "liquid" rocket engine. One obviously considerable advantage over the use of a bipropellant is the elimination of the exacting requirement for precise dual metering, and simultaneous flow activation, of the two separate fluids of the bipropellant. However, since electrolytically dissociatable fluid monopropellants, such as liquid hydrazine-hydrazine azide, are stable materials, the fluid monopropellant used must be energized, initiated, or otherwise ignited before its own heat generation becomes sufficient to "bootstrap" the decomposition reaction.

We have invented a novel and reliable electrolytic device for effecting the ignition of an electrolytically dissociatable fluid monopropellant, wherein which said igniter device has, in addition, a low power requirement. We have, thereby, significantly advanced the state-of-the-art.

SUMMARY OF THE INVENTION

This invention teaches a unique electrolytic device useable as an igniter of an electrolytically dissociatable fluid monopropellant, which said igniter is adapted for use in a liquid rocket engine.

The principal object of this invention is to provide such an electrolytic igniter device.

Another object of this invention is to provide such a device which, in addition, has a low power requirement, i.e., in the range of 2 to 30 volts.

These objects, and still other related and equally important objects, of my invention will become readily apparent after a consideration of the description of the invention, coupled with reference to the drawings.

DESCRIPTION OF THE DRAWINGS

FIG. 4 is a top plan view, in cross section and in schematic form, of a rocket engine in which is incorporated another preferred embodiment of my invention;

FIG. 5 is a top plan view, in cross section partially fragmented, and in schematic form, of a rocket engine in which is incorporated still another preferred embodiment of my invention;

FIG. 6 is a side elevation view, in schematic form, of an electrode assembly which is incorporated in the preferred embodiment shown in FIG. 5; and, FIG. 7 is a side elevation view, in schematic form, of a screen component which is incorporated in the preferred embodiment shown in FIG. 6.

DESCRIPTION OF THE PREFERRED EMBODIMENT

General

For the purpose of showing the versatility of our invention, and also for the purpose of more clearly showing the unique features of our invention, three preferred embodiments of our invention will be shown and described, as adapted for the particular and very specific use as electrolytic igniters for rocket engines in which an electrolytically dissociatable fluid monopropellant is useable.

It is to be noted, and to be remembered, that the preferred embodiments disclosed are merely representative of my invention; and, that they are simply by way of illustration, and not by way of any limitation.

As to One Preferred Embodiment

Figure 1:
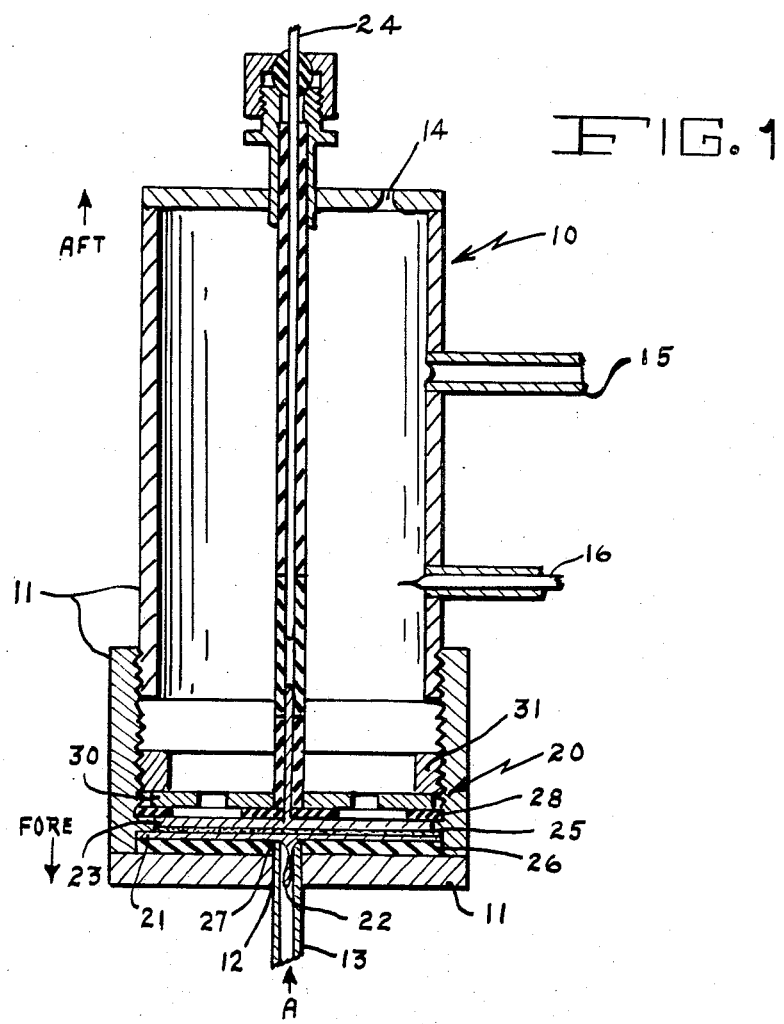
FIG. 1 is a top plan view, in cross section and in schematic form, of a rocket engine in which is incorporated a preferred embodiment of my invention.
Figure 2:
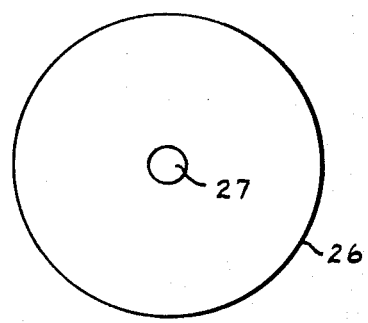
FIG. 2 is a side elevation view, in schematic form, of a representative first thermal insulating spacer which is a component of some of the preferred embodiments of my invention, including the preferred embodiment shown in FIG. 1.
Figure 3:
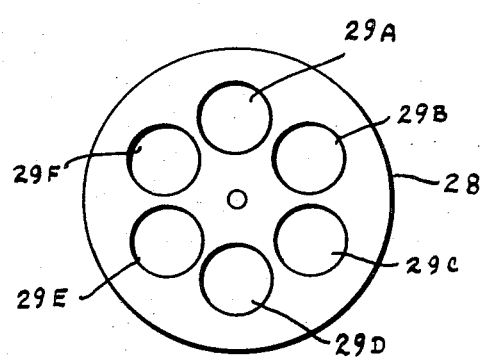
FIG. 3 is a side elevation view, in schematic form, of a representative second thermal insulating spacer which also is a component of some of the preferred embodiments of my invention, including the preferred embodiment shown in FIG. 1.

With reference to FIG. 1, 2 and 3, therein is shown one preferred embodiment, and components thereof, of our invention.

More specifically, and with reference to FIG. 1, rocket engine 10 is one in which an electrolytically dissociatable fluid monopropellant is useable. The fore and aft directions of said engine are designated by arrows which are appropriately labelled. Said rocket engine 10 includes: a metal body or casing 11, with said casing 11 having an inlet 12 which is located in the fore portion of the engine 10, and with said casing 11 also having an outlet 14 which serves as the exhaust nozzle of the engine 10; and, a hollow, conduit-like member 13 connected to the casing inlet 12, to permit the introduction into casing 11 (and rocket engine 10) of an electrolytically dissociatable fluid monopropellant from external of the casing 11 to, and through, inlet 12. The engine 10 may be, but need not be, instrumented with a pressure sensor 15 and/or a temperature sensor 16 to provide, for example, information as to engine performance.

An embodiment of our invention, in the form of a electrolytic igniter for rocket engine 10, is generally designated 20. The inventive igniter 20 includes: a first electrode 21 preferably in the configuration or form of a thin porous metal film, or of a screen, of electrically conductive material, with said first electrode 21 having a first suitable attachment 22 to provide for a first electrical lead, a second electrode 23 preferably also in the configuration or form of a thin metal film, or of a screen, of electrically conductive material, with said electrode 23 having a second suitable attachment 24 to provide for a second electrical lead; a thin porous electrical insulator 25 disposed between, and separating, said first electrode 21 and said second electrode 23; and, a suitable container, such as metal casing 11, to house said first electrode 21, said second electrode 23, and said insulator 25.

The two electrodes 21 and 23 are thermally isolated from the container, such as 11, by first thermal insulating spacer 26 and by second thermal insulating spacer 28 to prevent heat dissipation. As can be seen in FIG. 1, first thermal spacer 26 is located fore at first electrode 21 and aft of casing inlet 12; and, second thermal spacer 28 is located aft of second electrode 23 and also aft of casing inlet 12.

With reference to FIG. 2, which is a side elevation view of first thermal insulating spacer 26, said spacer 26 has a passageway 27, to permit entry therein of conduit 13 and the passage therethrough of the monopropellant, as shown in FIG. 1, wherein the direction of flow of the monopropellant is indicated by the arrow A.

FIG. 3 shows, in side elevation view, second thermal insulating spacer 28 which has, as can be seen, a plurality of openings (such as 29A–F, inclusive) therethrough, and preferably in regularly spaced relationship.

Again with reference to FIG. 1, the first electrode 21, the second electrode 23, the thin porous electrical insulator 25, the first thermal spacer 26, and the second thermal spacer 28 are kept essentially flat and in close contact by a metal pressure member 30, preferably in the shape of plate, which is driven by a threaded retaining ring 31, and which said pressure member 30 is located aft of the second thermal spacer 28. As to Another Preferred Embodiment Shown in FIG. 4 is another preferred embodiment, the second embodiment of which also is in the form of an electrolytic igniter for a rocket engine 40, which said engine 40 is essentially similar to engine 10 of FIG. 1, with said second embodiment generally designated 50.

When FIG. 4 is compared with FIG. 5, both Figures being top plan views in cross section, it can be easily ascertained that there are at least three significant structural differences as to inventive igniter 20 and inventive igniter 50. Firstly, inventive igniter 50 includes a plurality, such as three, of thermal screens, such as 51A–51C, inclusive, which do not comprise any component of igniter 20, FIG. 1. Said thermal screens 51A–51C are disposed aft of second electrode 52, which is similar to second electrode 23, FIG. 1, and are in spaced relationship to, and adjacent to, each other. Secondly, igniter 50 includes a plurality of third thermal insulating spacers, such as the three referenced 53A, 53B and 53C, which also do not comprise any component of igniter 20, with a different one of said plurality of third thermal insulating spacers interposed in the space between each two adjacent thermal screens (e.g., third thermal insulating spacer 53A is interposed in the space between adjacent thermal screens 51A and 51B). Thirdly, igniter 50 includes a ceramic collar 54, which also is not any part of igniter 20, FIG. 1. Said ceramic collar 54 is located fore of, and abutting with, threaded retaining ring 55 which is similar to threaded retaining ring 31, FIG. 1.

The functional significance of the above-mentioned structural differences will be discussed later herein.

Also shown in FIG. 4 is the directional flow of the monopropellant, with said flow indicated by the arrow B.

As to Still Another Preferred Embodiment

With reference to FIGS. 5, 6 and 7, therein is shown still another preferred embodiment, and components thereof, of our invention. This third embodiment of our invention, adapted for use as an electrolytic igniter, is for use with, and in, rocket engine 60, partially fragmented in the interest of maintaining simplicity of the drawing, in which said engine 60 an electrolytically dissociatable fluid monopropellant is useable. Engine 60 has a metal casing 61, of which only the fore portion is shown in FIG. 5, and said casing 61 has an internal surface 62. This third embodiment of our invention is generally designated 70 in FIG. 5. Also shown in FIG. 5 is the directional flow of the monopropellant, with said flow indicated by the arrow C.

Still with reference to FIG. 5, therein is shown our electrolytic igniter 70 which includes: an electrode assembly 71 having a longitudinal axis D–E; a screen 76, shown also in FIG. 7; and, a porous insulator 79. The electrode assembly 71 includes: a first electrode 72, shown in FIGS. 5 and 6, in the form of a flat thin metal film or of a screen, of electrically conductive material, with a first electrical lead 73 attached thereto; a second electrode 74, also in the form of a flat thin metal film, or of a screen, of electrically conductive material; and, a porous, electrically insulating, high temperature cloth 75, shown in FIGS. 5 and 6, interposed between said first electrode 72 and said second electrode 74.

Again with reference to FIGS. 5 and 6, the first electrode 72, the second electrode 74, and the interposed insulating cloth 75 are interspiralled to form a cylinder, with a portion of the second electrode 74 forming the external surface of said cylinder. The cylinder is positioned within, and the external surface thereof abuts with, i.e., is in contact with, the internal surface 62 of the rocket engine metal casing 61 which also serves as the second electrical lead, i.e., the lead for the second electrode 74.

As a related matter, the cloth spacer 75 may advantageously be pre-activated with a light, non-conducting coating of suitable material, such as ruthenium (metal).

With reference to the screen 76 as shown in FIG. 7, it is to be noted that it 76 has less porous center 77. Stated another way, the spot-like center portion 77 of screen 76 is relatively of a higher density than the remainder of the screen which is referenced by numeral 78. The screen 76 is positioned essentially perpendicular to the longitudinal axis D-E of electrode assembly 71, as shown in FIG. 5.

MODE OF OPERATION OF THE PREFERRED EMBODIMENTS

The mode of operation of the representative preferred embodiments 20, 50, and 70 of our invention, as adapted for use as electrolytic igniters, is easily understood from the foregoing description, coupled with reference to FIGS. 1–7, inclusive.

As a preliminary matter, it is to be noted that, in the operation of any of our three above-mentioned and disclosed preferred embodiments, a potential (difference), i.e., a voltage, of from 2 to 30 volts, which is a relatively low range of voltage or "power requirement", is applied across the applicable electrodes, such as 21 and 23 of the embodiments, such as 20, FIG. 1, with the result that one electrode, such as electrode 23, is or becomes of opposite polarity from the other electrode, such as 21. Since, initially, the electrodes, such as 21 and 23, are free of the electrolytically dissociatable, i.e., ionically conductive, fluid monopropellant to be used, no current passes between the electrodes.

Assuming that the appropriate electrodes (and the lead attachments, if any thereto) are in fact connected to a voltage source, i.e., to a "power" supply source), and also assuming that the embodiment (or, as appropriate, the rocket engine inlet line) is connected to a suitable source of the electrolytically dissociatable, i.e., ionically conductive fluid monopropellant to be used, such as liquid hydrazine-hydrazine azide, then with reference to FIG. 1: the liquid monopropellant is fed through the fuel inlet line 13 and into the rocket engine, such as 10; a surge of current is produced; the liquid monopropellant passes through the midsection of first porous electrode 21; and, then it impinges upon the thin porous electrical insulator 25. In turn, the insulator 25 causes a portion of the monopropellant flow to be distributed across the face of the first electrode 21. At the same time, the remainder of the flowing liquid monopropellant flows through the porous insulator 25 to the second electrode 23, which is of opposite polarity from the first electrode 21. The liquid monopropellant begins dissociating; sufficient heat is generated to ignite the monopropellant; and, concurrently, the electrodes 21 and 23 become hot immediately. The monopropellant burns, and continues to burn even after the power is turned off. The decomposing, and the burning, of the monopropellant result in the formation of very hot gases which issue out of the nozzle 14 and act as, and serve as, propellant gases. The "burn" is ultimately ended simply by stopping the in-flow of the monopropellant.

Although the "burn" of the monopropellant by the use of embodiment 20, FIG. 1, is most satisfactory, even higher efficiency of the burn can be obtained, while using the same liquid monopropellant, by installing additional screens immediately downstream, i.e., aft, of the two electrodes. In that regard, reference is made to embodiment 50, FIG. 4. Therein is shown a representative plurality of said screens, such as 51A–51C, inclusive, which are of the thermal type. Each said screen is, as previously discussed and shown, thermally insulated from the other and from the second electrode, such as 52, by spacers, such as 53A–53C, inclusive. This is to insure obtaining higher peak temperatures more rapidly on each of the successively aligned elements. The mode of operation of this embodiment is similar to the mode of operation of embodiment 20, FIG. 1.

With reference to the third embodiment 70, FIG. 5, positive fuel dispersion across the entering face of the electrode assembly 71 is assured by using horizontally-positioned screen 76 with the less porous center spot 77. Although ignition of the fluid monopropellant is satisfactory using this embodiment 70, even more rapid ignitions can be obtained therewith if the cloth spacer 75 is pre-activated with a light, non-conductive coating of ruthenium metal. The mode of operation of this embodiment is similar to the mode of operation of embodiment 20, FIG. 1, and of embodiment 50, FIG. 4. It is to be noted that electrode assembly 71 is similar, functionally, to a stack of vertical screens.

CONCLUSION

It is clear from all of the foregoing and from the drawings herein, that the desired objects of our invention have been attained.

It is emphasized that, although there have been shown and described the fundamental unique features of our invention, as applied to three preferred embodiments adapted for a particular use, it is to be understood that various other embodiments, substitutions, additions, omissions, adaptations, and the like can be made by those of ordinary skill in the art, without departing from the spirit of the invention.

What we claim is:

1. An electrolytic igniter for a rocket engine in which an electrolytically dissociatable fluid monopropellant is useable, comprising:
   a. A first porous electrode of electrically conductive material, with said first electrode having a first suitable attachment to provide for a first electrical lead;
   b. a second porous electrode also of electrically conductive material, with said second electrode having a second suitable attachment to provide for a second electrical lead;
   c. a thin porous electrical insulator disposed between, and separating, said first electrode and said second electrode;
   d. and, a suitable container to house said first electrode, said second electrode, and said thin porous electrical insulator;
   whereby when a voltage is applied across said first and said second electrodes through said first and said second suitable lead attachments respectively, and whereby when thereafter an electrolytically dissociatable fluid monopropellant is introduced into, and through, said first electrode, said porous electrical insulator, and said second electrode, an initial surge of electrical current is produced, heat is generated, and said fluid monopropellant ignites, burns, and forms very hot propellant gases.

2. An electrolytic igniter, as set forth in claim 1, wherein said first electrode is in the form of a thin porous metal film and said second electrode also is in the form of a thin porous metal film.

3. An electrolytic igniter, as set forth in claim 1, wherein said first electrode is in the form of a screen and said second electrode also is in the form of a screen.

4. An electrolytic igniter, as set forth in claim 1, wherein said suitable container is a rocket engine casing of metal which includes:
   a. a inlet in said casing, with said inlet located fore of said first electrode;
   b. a hollow, conduit-like member connected to said casing inlet, to permit the introduction of an electrolytically dissociatable fluid monopropellant into said casing through said inlet;
   c. an outlet in said casing, serving as an exhaust nozzle;
   d. a first thermal insulating spacer located fore of said first electrode and aft of said inlet, to thermally isolate said first electrode from said metal casing and thereby prevent heat dissipation;
   e. a second thermal insulating spacer located aft of said second electrode and aft of said inlet, to thermally isolate said second electrode from said metal casing and thereby prevent heat dissipation;
   f. and, a metal pressure member, located aft of said second thermal insulating spacer, driven by a threaded retaining ring, to keep said first and second electrodes, said thin porous electrical insulator, and said first and second thermal insulating spacers essentially flat and in close contact.

5. An electrolytic igniter, as set forth in claim 4, which further includes:
   a. a plurality of thermal screens located aft of said second electrode, with said thermal screens disposed one aft of the other, in spaced relationship, and adjacent to each other;

b. a plurality of third thermal insulating spacers, with a different one of said plurality of third thermal insulating spacers interposed in the space between each two adjacent thermal screens;

c. and, a ceramic collar located fore of, and abutting with, said threaded retaining ring.

6. An electrolytic igniter for a rocket engine in which an electrolytically dissociatable fluid monopropellant is useable, and which said rocket engine has a metal casing with an internal surface, comprising:

a. an electrode assembly, essentially cylindrical in shape and having an external cylindrical surface and a longitudinal axis, which includes:

1. a first electrode of electrically conductive porous material, with a first electrical lead attached thereto;
2. a second electrode also of electrically conductive porous material;
3. and, a porous, electrically insulating, high temperature cloth, interposed between said first electrode and said second electrode;

with said first electrode, said second electrode and said interposed insulating cloth interspiralled to form a cylinder, with a portion of said second electrode forming the external cylindrical surface thereof, and with said cylinder positioned within, and the external surface thereof abutting with, the internal surface of said rocket engine metal casing;

b. a screen having a less porous center portion thereof positioned essentially perpendicular to the longitudinal axis of said electrode assembly;

c. and, a porous insulator disposed between, and abutting with, said electrode assembly and said screen.

7. An electrolytic igniter, as set forth in claim 6, wherein said first electrode is in the form of a thin porous metal film and said second electrode also is in the form of a thin porous metal film.

8. An electrolytic igniter, as set forth in claim 6, where said first electrode is in the form of a flat screen and said second electrode also is in the form of a flat screen 9. An electrolytic igniter, as set in claim 6, wherein said cloth interposed between said first and second electrodes is pre-activated with a light, non-conductive coating of suitable material.

10. An electrolytic igniter, as set forth in claim 9, wherein said light, non-conductive coating is of ruthenium.

* * * * *